United States Patent
Kim et al.

(10) Patent No.: US 11,244,027 B2
(45) Date of Patent: Feb. 8, 2022

(54) PROCESSOR, ELECTRONICS APPARATUS AND CONTROL METHOD THEREOF

(71) Applicant: SAMSUNG ELECTRONICS CO., LTD., Suwon-si (KR)

(72) Inventors: Gyeonghoon Kim, Suwon-si (KR); Jaeun Park, Suwon-si (KR); Youngrae Cho, Suwon-si (KR); Myungsun Kim, Seongnam-si (KR); Hyunjung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 199 days.

(21) Appl. No.: 16/426,325

(22) Filed: May 30, 2019

(65) Prior Publication Data

US 2019/0370309 A1    Dec. 5, 2019

(30) Foreign Application Priority Data

May 30, 2018  (KR) .................. 10-2018-0062167
Oct. 19, 2018  (KR) .................. 10-2018-0125239

(51) Int. Cl.
*G06F 17/15* (2006.01)
*G06N 3/08* (2006.01)

(52) U.S. Cl.
CPC .............. *G06F 17/15* (2013.01); *G06N 3/08* (2013.01)

(58) Field of Classification Search
CPC ...... G06F 17/15; G06F 17/153; G06F 7/5443; G06N 3/04; G06N 3/06; G06N 3/063; G06N 3/08

See application file for complete search history.

(56) References Cited

U.S. PATENT DOCUMENTS

| | | | | |
|---|---|---|---|---|
| 5,949,920 | A  * | 9/1999 | Jordan | G06T 5/20 382/279 |
| 9,619,735 | B1 | 4/2017 | Lineback et al. | |
| 2010/0223219 | A1* | 9/2010 | Kato | G06N 3/08 706/27 |
| 2015/0046675 | A1* | 2/2015 | Barry | G06F 9/3867 712/7 |
| 2018/0046894 | A1 | 2/2018 | Yao | |
| 2018/0082443 | A1 | 3/2018 | Risman et al. | |
| 2018/0096249 | A1 | 4/2018 | Kim et al. | |
| 2018/0137407 | A1 | 5/2018 | Du et al. | |

(Continued)

FOREIGN PATENT DOCUMENTS

| CN | 106250103 A | 12/2016 |
|---|---|---|
| CN | 106847335 A | 6/2017 |
| CN | 107341544 A | 11/2017 |

(Continued)

OTHER PUBLICATIONS

Written Opinion (PCT/ISA/237) dated Sep. 19, 2019, issued by the International Searching Authority in corresponding International Application No. PCT/KR2019/006493.

(Continued)

*Primary Examiner* — Jaweed A Abbaszadeh
*Assistant Examiner* — Emily E Larocque
(74) *Attorney, Agent, or Firm* — Sughrue Mion, PLLC

(57) ABSTRACT

Disclosed is an electronic apparatus which executes an artificial intelligence algorithm using a convolution calculation unit and memory local to the electronic apparatus.

18 Claims, 9 Drawing Sheets

(56) References Cited

U.S. PATENT DOCUMENTS

2018/0137642 A1 5/2018 Malisiewicz et al.
2019/0220742 A1* 7/2019 Kuo .................... G06N 3/0481

FOREIGN PATENT DOCUMENTS

| JP | 2016-99707 A | 5/2016 |
|----|--------------|--------|
| WO | 2009/041350 A1 | 4/2009 |
| WO | 2018071546 A1 | 4/2018 |

OTHER PUBLICATIONS

International Search Report (PCT/ISA/210) dated Sep. 19, 2019, issued by International Searching Authority in corresponding International Application No. PCT/KR2019/006493.

Steven W. Smith "Digital Signal Processors" Digital Signal Processing: A Practical Guide for Engineers and Scientists, 2003, [retrieved on Aug. 28, 2019], Retrieved from <https://www.sciencedirect.com/topics/engineering/circular-buffering> (pp. 503-534).

Communication dated Mar. 2, 2021, issued by the European Patent Office in European Application No. 19810582.7.

Peemen et al., "Memory-Centric Accelerator Design for Convolutional Neural Networks," 2013 IEEE 31st International Conference on Computer Design (ICCD), Oct. 2013, Total 7 pages, XP055195589.

Communication dated Dec. 16, 2021, issued by the Indian Intellectual Property Office in Indian English Patent Application No. 202017053354.

* cited by examiner (a)

(b)

PROCESSOR, ELECTRONICS APPARATUS AND CONTROL METHOD THEREOF

CROSS-REFERENCE TO RELATED APPLICATIONS

This application is based on and claims priority under 35 U.S.C. § 119 to Korean Patent Application No. 10-2018-0125239, filed on Oct. 19, 2018, and Korean Patent Application No. 10-2018-0062167, filed on May 30, 2018, in the Korean Intellectual Property Office, the disclosures of which are herein incorporated by reference in their entireties.

BACKGROUND

Field

The disclosure relates to a processor, an electronic apparatus, and a control method thereof and, more particularly, to a processor for performing a convolution calculation on input data, an electronic apparatus, and a control method thereof.

Description of the Related Art

Recently, artificial intelligence (AI) systems implementing intelligence of a human level are used in various fields. An AI system refers to a system in which a machine learns, determines, and becomes smarter, unlike conventional rule-based smart systems. An AI system shows a more improved recognition rate as iterations are performed, and becomes capable of more accurately understanding user preference. For this reason, conventional rule-based smart systems are gradually being replaced by deep learning-based AI systems.

Artificial intelligence technology consists of machine learning (for example, deep learning) and element technologies utilizing machine learning.

Machine learning refers to technique of classifying/learning the characteristics of input data, and an element technology refers to a technology of simulating functions of a human brain such as cognition and determination by using a machine learning algorithm such as deep learning, and includes fields of technologies such as linguistic understanding, visual understanding, inference/prediction, knowledge representation, and operation control.

Examples of various fields to which AI technologies are applied are as follows. Linguistic understanding refers to a technology of recognizing languages/characters of humans, and applying/processing them, and includes natural speech processing, machine translation, communication systems, queries and answers, voice recognition/synthesis, and the like. Visual understanding refers to a technology of recognizing an object in a similar manner to human vision, and processing the object, and includes recognition of an object, tracking of an object, search of an image, recognition of humans, understanding of a scene, understanding of a space, improvement of an image, and the like. Inference/prediction refers to a technology of determining information and then making logical inference and prediction, and includes knowledge/probability based inference, optimization prediction, preference based planning, recommendation, and the like. Knowledge representation refers to a technology of automatically processing information of human experiences into knowledge data, and includes knowledge construction (data generation/classification), knowledge management (data utilization), and the like. Operation control refers to a technology of controlling autonomous driving of vehicles and movements of robots, and includes movement control (navigation, collision, driving), operation control (behavior control), and the like.

The AI applications described above may be executed in a processor capable of processing a deep neural network (DNN). However, because the capacity of the internal memory required to process the DNN for the input memory is limited, there is a problem that the processor has to perform communication with an external memory to input and output data. In particular, because time is required to read data from and write data to an external memory, there is a problem that the time required to process the DNN for the input data increases proportionally.

Accordingly, there is a necessity for a method of processing DNN for input data by efficiently using an internal memory having a limited capacity.

SUMMARY

Embodiments may overcome the above disadvantages and other disadvantages not described above. Also, an embodiment is not required to overcome the disadvantages described above, and an embodiment may not overcome any of the problems described above.

The disclosure is to provide a processor which performs a convolution calculation on input data and stores obtained data in an internal memory, an electronic apparatus, and a control method thereof.

According to an embodiment, a processor includes a memory, a convolution calculation unit; and a controller to, based on data input from a buffer as many as lines corresponding to a number of lines of first kernel data being stored in the memory, provide the stored input data to the convolution calculation unit, based on a first calculation data being output by the convolution calculation unit, store the received first calculation data in the memory, and based on the first calculation data as many as a number of lines corresponding to a second kernel data being stored in the memory, provide the stored first calculation data to the convolution calculation unit, and the convolution calculation unit to obtain the first calculation data by performing a convolution calculation based on the input data and the first kernel data, and obtain second calculation data by performing a convolution calculation based on the first calculation data and the second kernel data, and the controller to store data that is input from the buffer after the first calculation data is provided to the convolution calculation unit at a position where the first stored data is stored among the first calculation data stored in the memory.

The controller may provide the first calculation data to the convolution calculation unit, based on the second calculation data being received from the convolution calculation unit, store the received second calculation data in the memory, and based on the second calculation data as many as a number of lines corresponding to third kernel data being stored, provide the stored second calculation data to the convolution calculation unit, based on the data input from the buffer as many as one line being stored in the memory after the first calculation data is provided to the convolution calculation unit, provide data as many as a number of lines corresponding to the first kernel data including a corresponding line to the convolution calculation unit, and based on the first calculation data being received, store the received first calculation data at a position where the first stored data is stored among the second calculation data.

The memory is capable of storing data as many as lines corresponding to a number of lines of the first kernel data to $M^{th}$ kernel data, at the minimum.

The controller may provide $M-1^{th}$ calculation data to the convolution calculation unit, based on $M-2^{th}$ calculation data based on data input from the buffer being received after the first calculation data is provided to the convolution calculation unit, store the received $M-2^{th}$ calculation data at a position where first stored data is stored among the $M-1^{th}$ calculation data, based on $M-1^{th}$ calculation being received after $M-2^{th}$ calculation data as many as lines corresponding to a number of lines of $M-1^{th}$ kernel data including the $M-2^{th}$ calculation data is provided to the convolution calculation unit, store the received $M-1^{th}$ calculation data at a position where first stored data is stored among the input data.

The controller may, based on $M-1^{th}$ calculation data as many as lines corresponding to a number of lines of the $M^{th}$ kernel data being stored, provide the $M-1^{th}$ calculation data to the convolution calculation unit, and output the $M^{th}$ calculation data received from the convolution calculation unit.

The controller may, while $M-3^{th}$ calculation data as many as lines corresponding to a number of lines of $M-2^{th}$ kernel data is stored, store the $M-2^{th}$ calculation data received from the convolution calculation unit at a position where first stored data is stored among $M-1^{th}$ calculation data stored in the memory, and while the $M-2^{th}$ calculation data as many as lines corresponding to a number of lines of $M-1^{th}$ kernel data is stored, store the $M-1^{th}$ calculation data received from the convolution calculation unit at a position where first stored data is stored among the input data stored in the memory.

The memory is a circular memory.

The data input from the buffer may include a logical address, and the controller may store the input data in the memory based on the logical address.

According to an embodiment, an electronic apparatus includes a buffer configured to group input data in a unit of a line and allocate a logical address, and a processor including a memory and a convolution calculation unit, and the processor to store the data input from the buffer based on the logical address, based on the data as many as lines corresponding to a number of lines of first kernel data being stored in the memory, provide the stored input data to the convolution calculation unit, based on first calculation data being output by the convolution calculation unit, store the received first calculation data in the memory, based on the first calculation data as many as lines corresponding to second kernel data being stored, provide the stored first calculation data to the convolution calculation unit, and after the first calculation data is provided to the convolution calculation unit, store data input from the buffer at a position where first stored data is stored among first calculation data stored in the memory.

The convolution calculation unit may obtain the first calculation data by performing a convolution calculation based on the input data and the first kernel data, and obtain the second calculation data by performing a convolution calculation based on the first calculation data and the second kernel data.

According to an embodiment, a control method of a processor including a memory and a convolution calculation unit includes, based on data input from a buffer as many as lines corresponding to a number of lines of first kernel data being stored in the memory, providing the stored input data to the convolution calculation unit; obtaining first calculation data by performing a convolution calculation based on the input data and the first kernel data; based on the first calculation data being output by the convolution calculation unit, storing the received first calculation data in the memory; based on the first calculation data as many as a number of lines corresponding to second kernel data being stored in the memory, providing the stored first calculation data to the convolution calculation unit; and obtaining second calculation data by performing a convolution calculation based on the first calculation data and the second kernel data, and storing data that is input from the buffer after the first calculation data is provided to the convolution calculation unit at a position where the first stored data is stored among the first calculation data stored in the memory.

The method may include providing the first calculation data to the convolution calculation unit and, based on the second calculation data being received from the convolution calculation unit, storing the received second calculation data in the memory; based on the second calculation data as many as a number of lines corresponding to third kernel data being stored, providing the stored second calculation data to the convolution calculation unit; based on the data input from the buffer as many as one line being stored in the memory after the first calculation data is provided to the convolution calculation unit, providing data as many as a number of lines corresponding to the first kernel data including a corresponding line to the convolution calculation unit; and based on the first calculation data being received, storing the received first calculation data at a position where the first stored data is stored among the second calculation data.

The memory is capable of storing data as many as lines corresponding to a number of lines of the first kernel data to $M^{th}$ kernel data, at the minimum.

The method may include providing $M-1^{th}$ calculation data to the convolution calculation unit; based on $M-2^{th}$ calculation data based on data input from the buffer being received after the first calculation data is provided to the convolution calculation unit, storing the received $M-2^{th}$ calculation data at a position where first stored data is stored among the $M-1^{th}$ calculation data; and based on $M-1^{th}$ calculation being received after $M-2^{th}$ calculation data as many as lines corresponding to a number of lines of $M-1^{th}$ kernel data including the $M-2^{th}$ calculation data is provided to the convolution calculation unit, storing the received $M-1^{th}$ calculation data at a position where first stored data is stored among the input data.

The method may include, based on $M-1^{th}$ calculation data as many as lines corresponding to a number of lines of the $M^{th}$ kernel data being stored, providing the $M-1^{th}$ calculation data to the convolution calculation unit, and outputting the $M^{th}$ calculation data received from the convolution calculation unit.

The method may include, while $M-3^{th}$ calculation data as many as lines corresponding to a number of lines of $M-2^{th}$ kernel data is stored, storing the $M-2^{th}$ calculation data received from the convolution calculation unit at a position where first stored data is stored among $M-1^{th}$ calculation data stored in the memory; and while the $M-2^{th}$ calculation data as many as lines corresponding to a number of lines of $M-1^{th}$ kernel data is stored, storing the $M-1^{th}$ calculation data received from the convolution calculation unit at a position where first stored data is stored among the input data stored in the memory.

The memory may be a circular memory.

The data input from the buffer may include a logical address, and the providing the input data to the convolution calculation unit may include storing the input data in the memory based on the logical address.

According to various embodiments, as data which is obtained by performing a convolution calculation is stored in an internal memory, and data required for performing a convolution calculation is retrieved from the internal memory, the processor may perform DNN for the input data regardless of a bandwidth between the processor and the external memory.

Additional aspects and advantages of embodiments are set forth in the detailed description, and will be obvious from the detailed description, or may be learned by practicing embodiments.

BRIEF DESCRIPTION OF THE DRAWING FIGURES

The above and/or other aspects, features, and advantages of certain embodiments of the disclosure will be more apparent from the following description taken in conjunction with the accompanying drawings, in which.

DETAILED DESCRIPTION OF THE EMBODIMENTS

Figure 1:
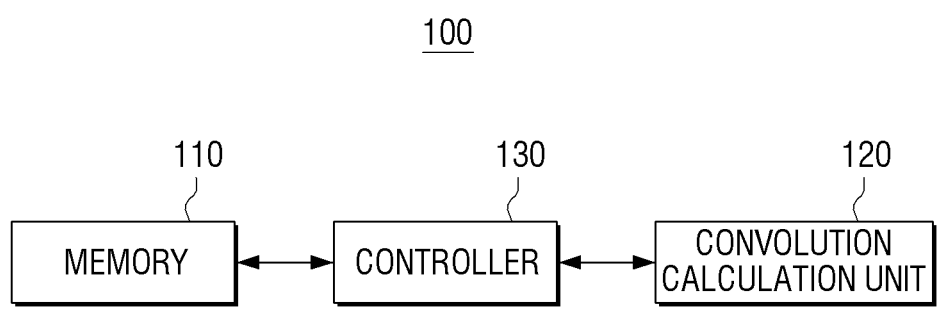
FIG. 1 is a block diagram illustrating a configuration of a processor according to an embodiment of the disclosure.

After terms used in the specification are briefly described, the disclosure will be described in detail.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined on the basis of the meaning of the terms and the contents throughout the disclosure rather than simple names of the terms.

Because the disclosure may be variously modified and have several embodiments, specific embodiments of the disclosure will be illustrated in the drawings and be described in detail in the detailed description. However, it is to be understood that the disclosure is not limited to specific embodiments, but includes all modifications, equivalents, and substitutions without departing from the scope and spirit of the disclosure. When it is decided that a detailed description for the known art related to the disclosure may obscure the gist of the disclosure, the detailed description will be omitted.

Terms 'first', 'second', and the like, may be used to describe various components, but the components are not to be construed as being limited by the terms. The terms are used only to distinguish one component from another component.

Singular forms are intended to include plural forms unless the context clearly indicates otherwise. It will be further understood that terms "include" or "formed of" used in the present specification specify the presence of features, numerals, steps, operations, components, parts, or combinations thereof mentioned in the present specification, but do not preclude the presence or addition of one or more other features, numerals, steps, operations, components, parts, or combinations thereof.

In embodiments of the disclosure, a 'module' or a '~er/~or' may perform at least one function or operation, and be implemented by hardware or software or be implemented by a combination of hardware and software. In addition, a plurality of 'modules' or a plurality of '~ers/~ors' may be integrated in at least one module and be implemented by at least one processor except for a 'module' or a '~er/or' that is implemented by specific hardware.

Hereinafter, embodiments of the disclosure will be described in detail with reference to the accompanying drawings so that those skilled in the art to which the disclosure pertains may easily practice the disclosure. However, the disclosure may be implemented in various different forms and is not limited to embodiments described herein. In addition, in the drawings, portions unrelated to the description will be omitted to obviously describe the disclosure, and similar portions will be denoted by similar reference numerals throughout the specification.

FIG. 1 is a block diagram illustrating a configuration of a processor according to an embodiment of the disclosure.

As illustrated in FIG. 1, a processor 100 includes a memory 110, a convolution calculation unit 120, and a controller 130.

The memory 110 may store data input from a source, such as a buffer. Here, the input data may be at least a part of an image. The buffer may be a streaming input buffer, and may allocate a logical address to data input from a previous stage of the streaming environment. For example, the buffer may allocate an address in a unit of a line to pixel data in an image input from the previous stage.

The memory 110 according to an embodiment may store data input from an external buffer. Here, the memory 110 may store input data in a memory based on a logical address.

According to an embodiment, the memory 110 may be implemented as a memory capable of storing data corresponding to a predetermined number of lines. For example, the memory 110 may store data corresponding to a capacity of 20 lines in a vertical direction. However, the embodiment is not limited thereto, and the storage capacity of the memory may be variously implemented. For example, if a full HD image of 1080p (a resolution of 1,920×1,080) is input, the pixel data corresponding to an image area of 20 lines in the full HD image may be stored in the memory 110. Due to limitation of hardware, the storage capacity of memory in the processor 100 is limited and thus, a part of an area of the input image frame may be stored in the memory 110.

For example, a case that a conventional processor performs image processing for a HD image of 720p (a resolution of 1280×720) in a tile size of 32×32 (1 pixel size is 2 bytes) is assumed. In order for a conventional processor to perform an image processing using an internal memory, there is a problem in that a relatively large internal memory in a size of 1280×10×32×2 bytes (800 KB) needs to be provided.

In addition, a method of storing data in an external memory having a large size relative to internal memory is difficult for image processing for ultra-high definition (UHD) and high-performance (60 frame per second (FPS)) image, because the memory bandwidth is limited. Here, the data may refer to a plurality of layers generated or obtained during an image processing process.

The processor 100 according to an embodiment may efficiently store streaming data input from a previous stage in the internal memory 110 and perform image processing regardless (independently) of limited memory bandwidth with the external memory.

The convolution calculation unit 120 may perform a convolution calculation based on the received data and the kernel data. Here, the received data may be data provided to the convolution calculation unit 120 under the control of the controller 130, among the data stored in the memory 110.

The kernel data may be a weight data trained with the deep neural network (DNN). Here, the DNN is a multi-layer neural network having a special connection structure designed for voice processing, image processing, and the like. For example, the convolution neural network (CNN) may filter an image through pre-processing of pixels, and recognize the features of the image. For example, the kernel data may be Nx*Ny*Cin*Cout data. Here, Cin is an input channel of a specific layer of the network, and Cout may refer to an output channel of a specific layer of the network. The convolution calculation unit 120 may perform a convolution calculation based on the data provided by the memory 110 and the kernel data and obtain the calculation data. The kernel data may be variously referred to as a filter, a weight matrix, a learning matrix, or the like, but will hereinafter be referred to as kernel data for convenience of description. The convolution calculation unit 120 may be a processing element for performing a convolution calculation provided in the processor.

According to an embodiment, the convolution calculation unit may obtain first calculation data to $M^{th}$ calculation data based on first to $M^{th}$ kernel data. For example, a convolution calculation may be performed on the basis of input data and first kernel data, and first calculation data may be obtained. In addition, a convolution calculation may be performed on the basis of the first calculation data and the second kernel data, and the second calculation data may be obtained. Here, each of the first to $M^{th}$ kernel data may be referred to as a first to $M^{th}$ filter.

The convolution calculation unit 120 may perform a convolution calculation while the input data or calculation data are being circulated. According to an embodiment, each of the first to $M^{th}$ kernel data may be a matrix format of a different size. In addition, each of the first to $M^{th}$ kernel data may be composed of different values. According to an embodiment, the processor 100 may use different filters in performing a convolution calculation to obtain the first to $M^{th}$ calculation data. For example, when a convolution calculation is performed to obtain the first calculation data, the first kernel data may be used, and when a convolution calculation is performed to obtain the $M^{th}$ calculation data, the $M^{th}$ kernel data may be used. Here, each of the first kernel data to the $M^{th}$ kernel data may be a different set of filters.

According to an embodiment, the convolution calculation unit 120 may transmit the obtained calculation data to a controller 130. Here, the calculation data may be the data on which the convolution calculation is performed by the convolution calculation unit 120. The calculation data may mean a plurality of hidden layers according to DNN. Hereinafter, for convenience of description, a first to an $M-1^{th}$ hidden layers are collectively called first to $M-1^{th}$ calculation data, and the output layer is referred to as the $M^{th}$ calculation data.

The controller 130 controls an overall operation of the processor 100.

The controller 130 may store the data input from the buffer in the memory 110. According to an embodiment, when the input data as many as the lines corresponding to the number of lines of the first kernel data is stored in the memory 110, the controller 130 may provide the stored input data to the convolution calculation unit 120. For example, when the first kernel data is Nx*Ny*Cin*Cout data, and the input data Ny is stored in the memory 110, the controller 130 may provide the Ny input data to the convolution calculation unit 120.

According to one embodiment, the convolution calculation unit 120 may perform a convolution calculation based on the Ny input data and the first kernel data and obtain first calculation data. The controller 130 may store the first calculation data received from the convolution calculation unit 120 in the memory 110.

The controller 130 may, when the first calculation data as many as the number of lines corresponding to the second kernel data is stored, provide the stored first calculation data to the convolution calculation unit 120. For example, the first kernel data may be in the format of a 3×3 matrix, and the second kernel data may be in the form of a 5×5 matrix. That is, the sizes of the first kernel data and the second kernel data may be different. When the first calculation data as many as the number of lines corresponding to the second kernel data (for example, 5) is stored, the convolution calculation unit 120 may perform a convolution calculation using the stored first calculation data and the second kernel data and obtain the second calculation data.

In the meantime, after the first calculation data is provided to the convolution calculation unit 120, the controller 130 may store the data input from the external buffer at a position where the first stored data is stored among the first calculation data stored in the memory 110.

The controller 130 according to an embodiment may provide the first calculation data to the convolution calculation unit 120, and when the second calculation data is received from the convolution calculation unit 120, may store the received second calculation data in the memory 110. Then, when the second calculation data as many as the number of lines corresponding to the third kernel data is stored in the memory 110, the controller 130 may provide the stored second calculation data to the convolution calculation unit 120.

In the meantime, after the first calculation data is provided to the convolution calculation unit 120, when the data input from the external buffer is stored in the memory 110 as many as one line, the controller 130 may provide the data as many as the number of lines corresponding to the first kernel data including the corresponding lines to the convolution calculation unit 120. For example, the controller 130 may store data that is newly input from the external buffer into the memory 110 based on the logical address. When the newly stored data as many as one line is stored, the controller 130 may provide the data as many as the number of lines corresponding to the first kernel data to the convolution calculation unit 120. For example, if the first kernel data is a format of a 5×5 matrix, the controller 130 may provide data as many as five lines including the newly stored data to the convolution calculation unit 120. Then, when the first calculation data is received from the convolution calculation unit 120, the controller 130 may store the newly received first calculation data at a position where the first stored data is stored among the second calculation data.

The controller 130 according to an embodiment may control the number of convolution calculation times of the convolution calculation unit 120. For example, the controller 130 may sequentially provide input data, first calculation data, . . . , M-1$^{th}$ calculation data, and the like, to the convolution calculation unit 120. According to one embodiment, the convolution calculation unit 120 may perform a convolution calculation on the M-1$^{th}$ calculation data provided from the controller 130 and obtain the M$^{th}$ calculation data. Here, the M$^{th}$ calculation data may be an output layer obtained by performing DNN on input data (or input layer). Specifically, the convolution calculation unit 120 may perform a convolution calculation on the input data to obtain the first calculation data, and perform convolution on the first calculation data to obtain the second calculation data. The convolution calculation unit 120 may perform a convolution calculation and sequentially obtain the first calculation data, . . . , M-2$^{th}$ calculation data, and M-1$^{th}$ calculation data, and perform convolution based on the M-1 calculation data and the M$^{th}$ kernel data and obtain the M$^{th}$ calculation data.

According to an embodiment, the convolution calculation unit 120 may obtain first to M$^{th}$ calculation data based on each of the first to M$^{th}$ kernel data. Here, the first to M$^{th}$ kernel data may have different sizes or shapes. However, the embodiment is not limited thereto, and the convolution calculation unit 120 may obtain operational data (or a hidden layer) by using various types of kernel data depending on the purpose of the image processing, or the like.

The controller 130 according to an embodiment may, when the M-1$^{th}$ calculation data as many as the number of lines corresponding to the M$^{th}$ kernel data is stored, provide the M-1$^{th}$ calculation data to the convolution calculation unit 120. When the M$^{th}$ calculation data is received from the convolution calculation unit 120, the controller 130 may output the M$^{th}$ calculation data to the output buffer. Here, the M$^{th}$ calculation data is an output layer obtained by successively processing the M$^{th}$ calculation data with DNN processing. According to an embodiment, if the input data is an image, the processor 100 may successively image-process and output the image frame in a streaming environment. Here, the image processing may mean noise reduction (NR), interlaced to progressive conversion (IPC), detail enhancement (DE), contrast enhancement (CE), or the like. An output buffer according to one embodiment may be referred to as a streaming output buffer, but will be referred to hereinafter as an output buffer for convenience of description. The output buffer may receive an input of the feature map output data in the form of a line. Here, the feature map output data may mean the M$^{th}$ calculation data. Then, the output buffer may output the data in pixel units based on the required frame per second (FPS).

In the meantime, the controller 130 according to an embodiment may provide the M-1$^{th}$ calculation data to the convolution calculation unit 120, and after the first calculation data is provided to the convolution calculation unit 120 and then the M-2$^{th}$ calculation data is received based on the data input from the buffer, the controller 130 may store the received M-2$^{th}$ calculation data at a position where the first stored data is stored among the M-1$^{th}$ calculation data stored in the memory 110.

According to an embodiment, the controller 130 may, after the M-2$^{th}$ calculation data as many as the lines corresponding to the lines of the M-1$^{th}$ kernel data including the M-2$^{th}$ calculation data is provided to the convolution calculation unit 120, when the M-1$^{th}$ calculation data is received, may store the received M-1$^{th}$ calculation data at a position where the first stored data is stored among the input data stored in the memory 110. Here, the M-1$^{th}$ calculation data may mean the data which includes the M-1$^{th}$ calculation data based on the newly input data.

The controller 130, while M-3$^{th}$ calculation data as many as the lines corresponding to the number of lines of the M-2$^{th}$ kernel data is stored, may store the M-2$^{th}$ calculation data received from the convolution calculation unit 120 at a position where the first stored data is stored among the M-1$^{th}$ calculation data stored in the memory 110.

In addition, the controller 130 may, while the M-2$^{th}$ calculation data as many as the lines corresponding to the number of lines of the M-1$^{th}$ kernel data is stored, store the M-1$^{th}$ calculation data stored from the convolution calculation unit 120 at a position where the first stored data is stored among the input data stored in the memory 110.

Here, the memory 110 may be a circular memory. The memory 110 may store the data as many as the lines corresponding to the number of lines of the first kernel data to the M$^{th}$ kernel data, at the minimum.

The controller 130 may control the memory 110 to store new data at a position where the first stored data is stored. In the memory 110 having a limited size, data may be stored in a circular structure. In the meantime, the memory 110 illustrated in FIG. 1 may mean a storage space provided in the processor 100 such as static random access memory (SRAM).

Figure 2:
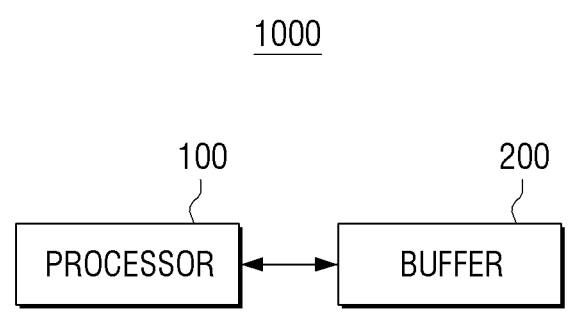
FIG. 2 is a block diagram illustrating a configuration of an electronic apparatus according to an embodiment.

FIG. 2 is a block diagram illustrating a configuration of an electronic apparatus according to an embodiment.

As illustrated in FIG. 2, an electronic apparatus 1000 includes the processor 100 and a buffer 200. The configuration of the processor 100 is the same as described in FIG. 1 and will not be described.

The electronic apparatus 1000 may be an apparatus capable of performing DNN processing on input data. For example, a user terminal device, a display device, a set-top box, a tablet personal computer, a smart phone, an e-book reader, a desktop PC, a laptop PC, a workstation, a server, a personal digital assistant (PDA), a portable multimedia player (PMP), an MP3 player, and the like. Alternatively, the electronic apparatus 1000 may refer to the system itself in which the cloud computing environment is established. However, the embodiment is not limited thereto, and the electronic apparatus 1000 may be any apparatus capable of artificial intelligence (AI) learning.

The buffer 200 connected to an input/output of the processor 100 may buffer and provide the input data to the processor 100. The buffer 200, according to another embodiment, is connected to another input/output of the processor 100 and may buffer the calculation data (or output layer) output by the processor 100 and provide the calculation data to another element in the electronic apparatus 1000.

In particular, the buffer 200 may receive an input of the feature map data which does not include memory address information in a pixel unit. The buffer 200 may group an input pixel in a line unit for performing a convolution calculation. Then, the buffer 200 may allocate a logical address in a line unit to the data. The processor 100 may store the data inputted from the buffer 200 in the memory 110 based on a logical address.

For example, the buffer 200 may buffer data inputted in units of pixels in a unit of a line, which is a unit of convolution calculation processing. Subsequently, when a line is formed with pixel data, the buffer 200 may allocate and provide a logical address to the processor 100. The processor 100 may store input data based on the logical address. According to an embodiment, the buffer 200 may be referred to as a streaming input buffer, but will hereinafter be referred to as the buffer 200 for convenience of description. A specific embodiment in which the buffer 200 provides calculation data to another element in the electronic apparatus 1000 will be described in FIG. 4.

The processor 100 controls overall operations of the electronic apparatus 1000 in.

According to an embodiment, the processor 100 may be implemented as a digital signal processor (DSP), a microprocessor, and a time controller (TCON), but is not limited thereto. The processor 100 may include one or more among a central processing unit (CPU), a micro controller unit (MCU), a micro processing unit (MPU), a controller, an application processor (AP), a communication processor (CP), and an Advanced Reduced instruction set computing (RISC) Machine (ARM) processor or may be defined as a corresponding term. The processor 100 may be implemented in a system on chip (SoC) type or a large scale integration (LSI) type which a processing algorithm is built therein or in a field programmable gate array (FPGA) type.

According to an embodiment, the electronic apparatus 1000 may include a memory outside the processor 100. The external memory is connected to the processor 100 and may receive an input of data from the processor 100 or output data to the processor 100.

According to an embodiment, the external memory may store the input data and the convolution calculation information. Here, the input data may be image data. The image frame constituting the image data received from the memory may be buffered through the buffer 200 as described below and provided to the processor 100.

According to an embodiment, the processor 100 may store the DNN-trained kernel data. For example, the electronic apparatus 1000 may perform convolution using the first to $M^{th}$ kernel data and obtain a final output layer through a plurality of hidden layers for the input data. Here, the output layer may mean image processed data, and the output layer may be provided to a next stage.

In addition, the processor 100 may store the convolution calculation information. Here, the convolution calculation information may include information on the number of performing convolution calculations, or the like. The processor 100 may perform a convolution calculation on the input data based on the convolution calculation information.

Figure 3:
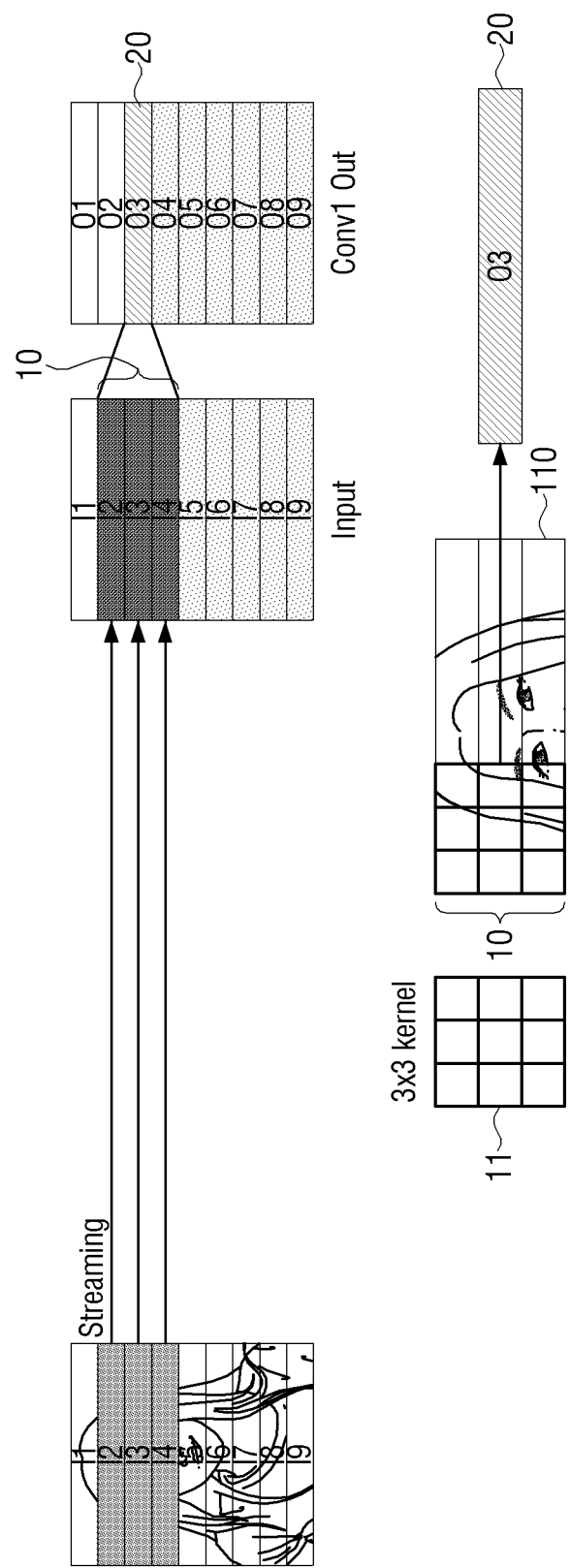
FIG. 3 is a view provided to describe a convolution according to an embodiment.

FIG. 3 is a view provided to describe a convolution according to an embodiment.

The processor 100 according to an embodiment may obtain calculation data by performing convolution on the input data which is input in a unit of a line and output calculation data.

As illustrated in FIG. 3, the controller 130 may store data 10 input from the buffer 200 in the memory 110. When the input data 10 as many as the lines corresponding to the number of lines of a first kernel data 11 is stored, the controller 130 may provide the input data 10 to the convolution calculation unit 120 and obtain first calculation data 20.

For example, when the first kernel data 11 is 3×3, and the input data 10 is stored in the memory 110 as many as three lines, the processor 100 may obtain single first calculation data 20 based on the input data 10 and the first kernel data 11. Referring to FIG. 3, when lines I2, I3, and I4 are formed as the input data 10 is stored in the memory 110, the processor 100 may perform convolution using the first kernel data and obtain the first calculation data 20 (O3). In the meantime, the first kernel data 11 is merely exemplary, and the processor 100 may perform convolution using various types of kernel data.

Figure 4:
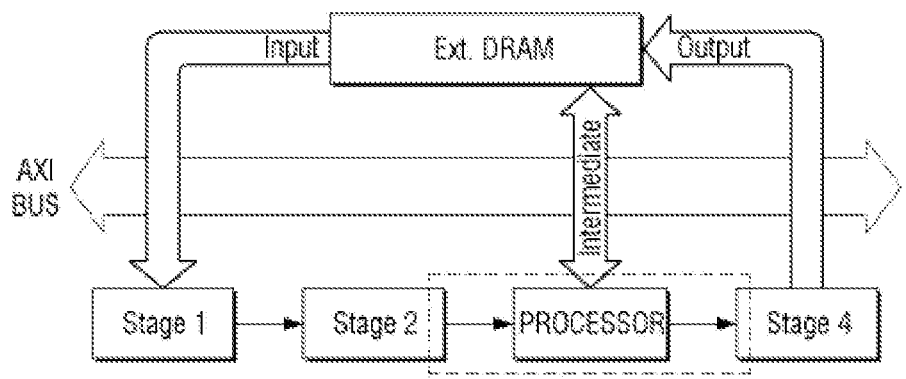
FIG. 4 is a view provided to describe a problem of a conventional art.

FIG. 4 is a view provided to describe a problem of a conventional art.

As illustrated in FIG. 4, the input data may be image-processed by passing through each of a plurality of stages. In particular, each stage may perform image processing corresponding to at least one of the noise reduction (NR), interlaced to progressive conversion (IPC), detail enhancement (DE), contrast enhancement (CE), or the like, for input data.

According to an embodiment, the DNN is used in performing image processing for input data in a specific stage.

In the case of the conventional processor, data outputted in stage 2 is provided to a next stage (stage 3). Then, in performing image processing in stage 3, the processor 100 stores a multi-layer generated according to performing convolution on the input data in an external memory (ext. DRAM), as capacity in the memory provided inside the processor 100 is limited. As the bandwidth for transceiving data with the external memory is limited, there has been a problem that time which is required for the processor 100 to perform convolution calculation increases, or a multi-layer is not generated. In addition, capacity of the conventional memory is not suitable for image processing of a high-definition image.

The processor 100 according to an embodiment may efficiently store the multi-layer generated according to the convolution calculation in the memory 110.

Hereinbelow, an embodiment in which a multi-layer is generated as the processor 100 performs convolution calculation will be described.

Figure 5:
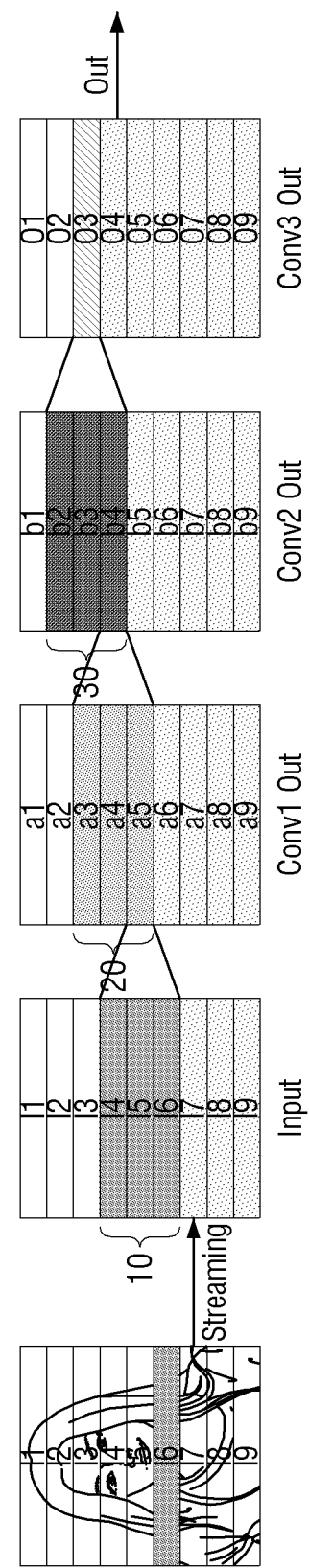
FIG. 5 is a view provided to describe a deep neural network according to an embodiment.

FIG. 5 is a view provided to describe a deep neural network (DNN) according to an embodiment.

Referring to FIG. 5, when the input data 10 is stored in the memory 110, and the input data 10 as many as the number of lines corresponding to the number of lines of the first kernel data 11 is stored, the processor 100 may perform a convolution calculation on the input data 10. As illustrated in FIG. 5, the first calculation data 20 (a4) may be obtained by performing convolution on the input data 10 (I4, I5, and I6). For convenience of description, it is assumed that the first to $M^{th}$ kernel data are in a 3×3 format, but the embodiment is not limited thereto, and the processor 100 may perform the convolution based on kernel data of various sizes. For example, if the first kernel data is a matrix of 3×3 format and the input data 10 is stored on the memory 110 as much as three lines, the processor 100 may perform convolution based on the input data 10 and the first kernel data and obtain the first calculation data 20.

When the first calculation data 20 is obtained as many as the number of lines corresponding to the second kernel data, the processor 100 may perform a convolution calculation on the first calculation data 20 and obtain the second calculation data 30. As illustrated in FIG. 5, the second calculation data 30 b4 may be obtained by performing a convolution on the first calculation data 20 (a3, a4 and a5). Here, the second kernel data may have a size different from the size of the first kernel data. For example, if the second kernel data is a matrix of 5×5 format, the second calculation data 30 may be obtained by performing a convolution on the first calculation data 20 (a3 to a7).

According to an embodiment, the processor 100 may perform a convolution calculation based on the second calculation data 30 (b2, b3, and b4) and the third kernel data, and obtain the third calculation data (or output data) 30 (O3). The processor 100 may obtain and output the third calculation data 30 (O1 to O9).

Here, the memory 110 provided in the processor 100 for the processor 100 to obtain the third calculation data 30 may store each of the input data 10, the first calculation data 20, and the second calculation data 30. In case of the conventional processor, as the capacity (or size) of the internal memory provided in the processor is limited to store all the input data 10, the first calculation data 20, and the second calculation data 30, data, hidden layer, or the like need to be stored in the external memory, and it was difficult to obtain a multi-layer.

Figure 6:
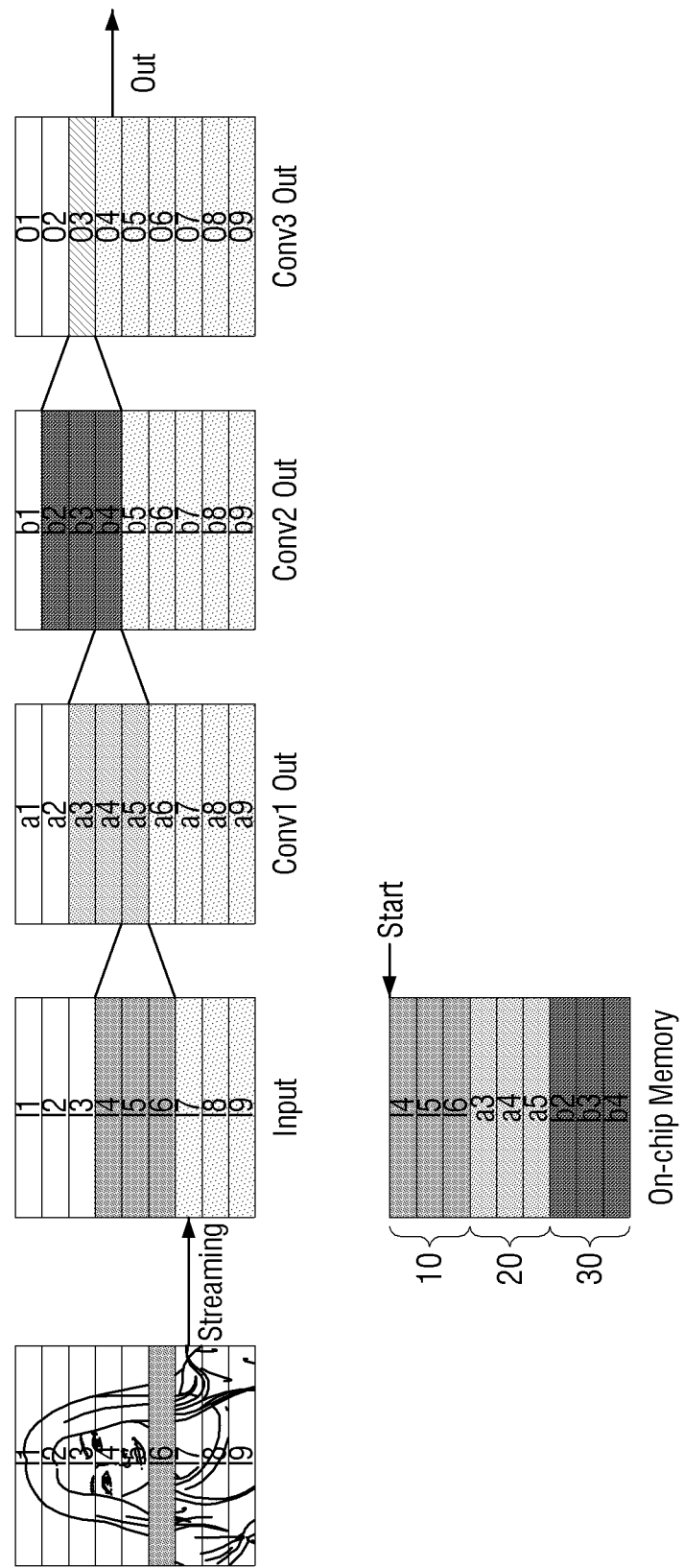
FIG. 6 is a view provided to describe a memory according to an embodiment.
Figure 7:
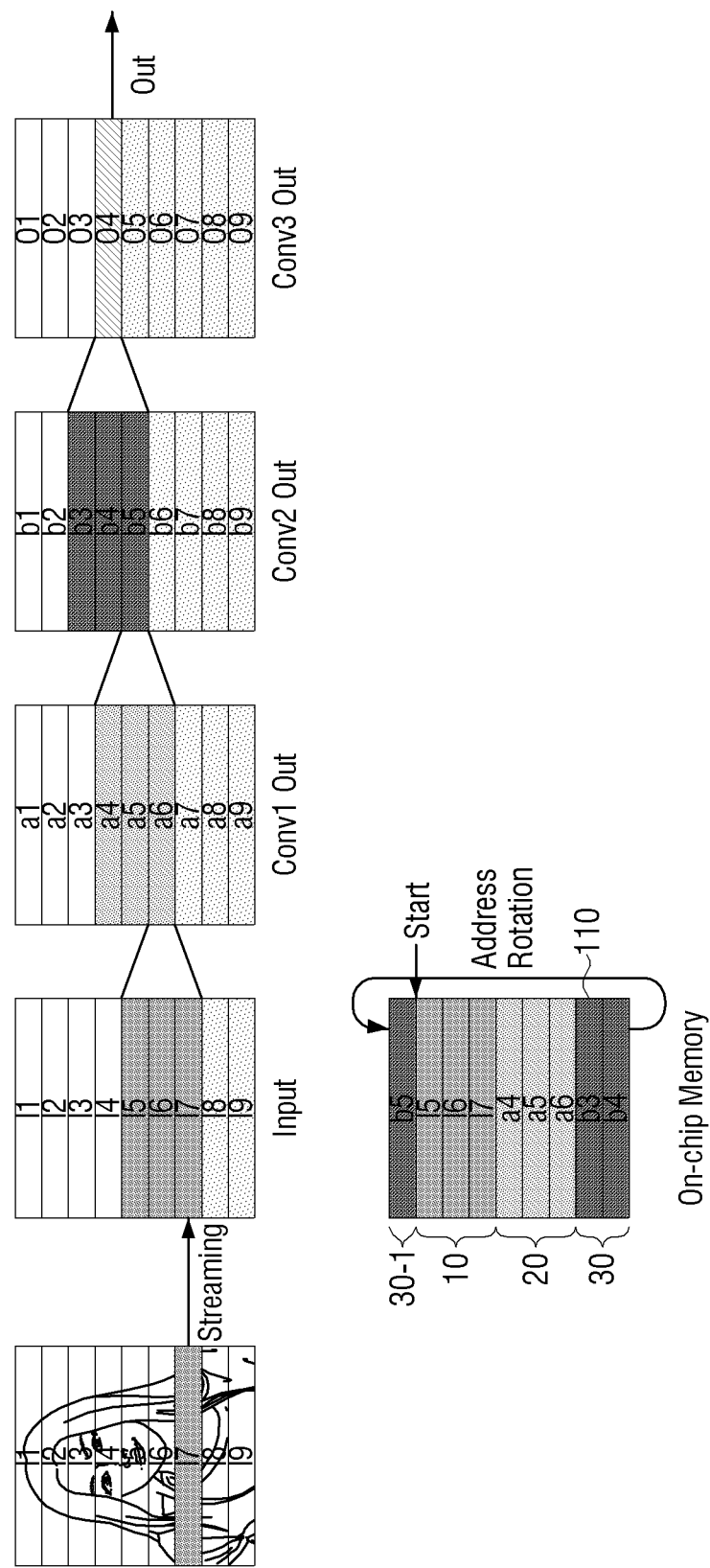
FIG. 7 is a view provided to describe a memory according to an embodiment.

FIGS. 6 and 7 are views provided to describe a memory according to an embodiment.

The processor 100 may store the data 10 input from the buffer in the memory 110, and when the input data 10 is stored as many as the lines corresponding to the number of lines of the first kernel data, the processor 100 may perform a convolution calculation on the stored input data 10 to obtain and store the first calculation data 20.

The processor 100, when the first calculation data 20 as many as the number of lines corresponding to the second kernel data is stored, may perform a convolution calculation on the first calculation data 20 to obtain and store the second calculation data 30.

For example, the processor 100 may perform a convolution calculation based on the input data 10 (I1, I2, and I3), and the first kernel data and obtain the first calculation data 20 (a1), and perform a convolution based on the first calculation data 20 (a1, a2, and a3), and the second kernel data, and obtain the second calculation data 30 (b1). Here, the memory 110 may store I1, I2, I3, a1, a2, a3, and b1.

The input data 10, the first calculation data 20, and the second calculation data 30 may be stored in the memory 110. For example, if the storage space of the memory 110 is represented as lines, the first calculation data 20 (a5) is obtained and stored by performing a convolution calculation on the input data 10 (I4, I5, and I6) stored in the first to third lines, and the second calculation data 30 (b4) may be obtained and stored by performing a convolution calculation on the first calculation data 20 (a3, a4 and a5) stored in the fourth to sixth lines. As illustrated in FIG. 6, the memory 110 may store the input data 10 (I4, I5, and I6), the first calculation data 20 (a3, a4, and a5), the second calculation data 30 (b2, b3, and b4). Here, the line may refer to a data processing unit formed as the processor 100 stores data on the memory 110 based on the logical address.

In the meantime, it is assumed a case where the processor 100 performs a convolution calculation on the first calculation data and obtains the second calculation data, and then store the new data input from the buffer in the memory 110.

Referring to FIG. 6, when the input data or calculation data is stored in each of the first to ninth lines of the memory 110, the data newly input from the buffer may be stored in one line among the first to ninth lines.

As illustrated in FIGS. 6 and 7, when the input data 10 I7 of the next line is received, after the processor 100 performs a convolution calculation on the first calculation data 20 (a3, a4, and a5), the processor 100 may store the data 10 (I7) newly input from the buffer at a position where a3 which is first stored among the first calculation data 20 stored in the memory 110 is stored.

According to an embodiment, when the first calculation data 20 (a6) is obtained by performing a convolution calculation on the input data 10 (I5, I6, and I7) of three lines including the newly input data 10 (I7) after a convolution is performed on the second calculation data 30 (b2, b3, and b4), the processor 100 may store the first calculation data 20 a6 at a position where the data b2 which is first stored among the second calculation data 30 (b2, b3, and b4) is stored.

Referring to FIG. 7, while the second calculation data 30 is stored as the number of N−1, that is, as many as two lines, when the processor 100 according to an embodiment performs a convolution calculation on the first calculation data 20 (a4, a5, and a6), and obtain the second calculation data 30 (b5) 30-1, the processor 100 may store the second calculation data 30 (b5) 30-1 in the first line. The input data 10 (I4) stored in the first line may be replaced with the second calculation data 30 (b5) 30-1. To be specific, the processor 100 may perform a convolution calculation on the lines I5, I6, and I7 formed from the input data 10 and obtain the first calculation data 20 (a6). Then, the processor 100 may perform a convolution calculation on the first calculation data 20 (a4, a5, and a6), and obtain the second calculation data 30 (b5) 30-1. Here, the second calculation data 30 (b5) 30-1 may not be stored in the next line of the second calculation data 30 b4 when the memory 110 is divided in a unit of lines. Accordingly, when the memory 100 is divided in a line unit, the processor 100 may store the second calculation data 30 (b5) 30-1 in the first line. For example, the line I4 formed from the input data stored in the first line may be replaced with the second calculation data 30 (b5) 30-1. Then, the new data input from the buffer is stored at the position of the first calculation data 20 (a4), and the line I8 may be formed.

According to an embodiment, when line I8 is formed as the data newly input from the buffer is stored in the memory 110, the processor 100 may sore the input data 10 I8 at a position where the data a4 which is first stored among the first calculation data 20 (a4, a5, and a6) stored in the memory 110 is stored.

The processor 100 may obtain the first calculation data 20 (a7) by performing a convolution calculation on the input data 10 (I6, I7 and I8), and store the first calculation data 10 (a7) at a position where the data b3 stored first among the second calculation data 20 (b3, b4, and b5) is stored. When the data newly input from the buffer forms one line, the processor 100 may obtain the first calculation data 20 based on the input data including the line and the first kernel data, and sequentially obtain the second calculation data 30 from the first calculation data 20.

According to an embodiment, the input data 10, the first calculation data 20, ..., the M-1$^{th}$ calculation data may be stored in the memory 110 with a circulatory structure. For example, the memory 110 may be implemented as a circular memory.

According to an embodiment, while the M-3$^{th}$ calculation data is stored as many as the lines corresponding to the number of lines of M-2$^{th}$ kernel data, the controller 130 may store the M-2$^{th}$ calculation data received from the convolution calculation unit 120 at a position where the first stored data among the M-1$^{th}$ calculation data stored in the memory 110 is stored, and while the M-2$^{th}$ calculation data is stored as many as the lines corresponding to the number of lines of the M-1$^{th}$ kernel data, the processor 100 may store the M-1$^{th}$ calculation data received from the convolution calculation unit 120 at a position where the first stored data among the input data stored in the memory 110 is stored.

Figure 8:
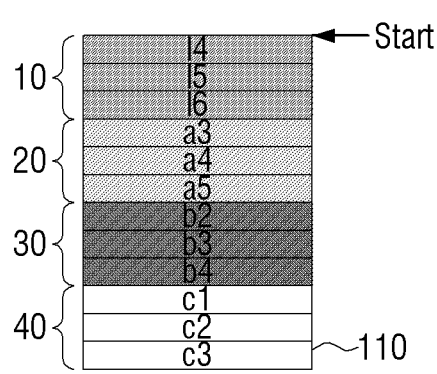
FIG. 8 is a view provided to describe a memory according to another embodiment.
Figure 8:
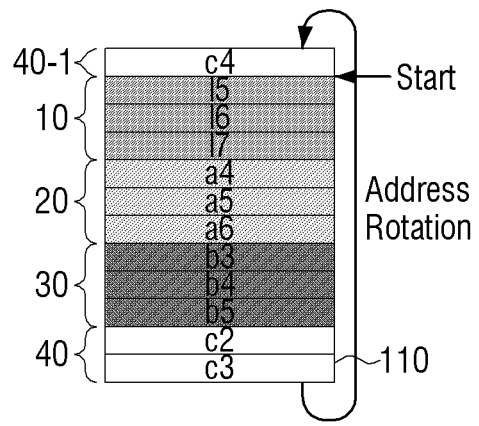

FIG. 8 is a view provided to describe a memory according to another embodiment.

Referring to FIG. 8, when the second kernel data is a matrix of a 3×3 format, the processor 100 may, while the first calculation data 20 is stored as many as three lines, perform a convolution calculation based on the first calculation data 20 (a3, a4, and a5) and the second kernel data and obtain the second calculation data 30 (b4). Then, when the third kernel data is a matrix of a 3×3 format, the processor 100 may perform a convolution calculation based on the second calculation data 30 (b2, b3, and b4), and the third kernel data and obtain the third calculation data 40 (c3).

According to an embodiment, the controller 130 may perform a convolution calculation on the input data to obtain the first to third calculation data, and finally obtain the fourth calculation data. Here, the fourth calculation data is output data (or an output layer), and may be output to a buffer. For example, the processor 100 may obtain the fourth calculation data based on the third calculation data 40 (c1, c2, and c3), and fourth kernel data, and output the fourth calculation data O1 to a buffer.

Referring to (b) in FIG. 8, when one line I7 is formed as data newly input from the buffer is stored in the memory 110, the processor 100 may obtain the first calculation data 20 (a6) based on the input data 10 (I5, I6, and I7) and the first kernel data. According to one embodiment, the processor 100 may overwrite the first calculation data 20 a6 with the first stored data b2 among the second calculation data 20 (b2, b3, and b4) stored in the memory 110. Also, the newly obtained M-1$^{th}$ calculation data according to an embodiment may be stored in the first stored data among the input data stored in the memory 110. Referring to FIG. 8B, the newly obtained third calculation data 40-1 (c4) may be stored at a position where the input data 10 (I4) is stored.

The memory 110 according to an embodiment may store data as many as lines corresponding to the number of lines of the first kernel data to the M$^{th}$ kernel data. According to one embodiment, the data newly input from the buffer may be stored in the first stored data among the first calculation data stored in the memory 110, and the newly obtained M-2$^{th}$ calculation data may be stored in the first stored data among the M-1$^{th}$ calculation data. That is, the memory 110, as a circular memory, may have the input data and the first to M-1$^{th}$ calculation data circularly stored therein, as shown in FIG. 8.

According to one embodiment, although the size of the memory 110 provided in the processor 100 is limited, a plurality of hidden layers and calculation data obtained in performing image processing through the DNN may be stored in the internal memory 110, instead of an external memory. The processor 100 may perform image processing without restriction on the bandwidth and the like with the external memory. The processor 100 according to an embodiment may perform DNN using only the internal memory 110 for high-definition images (e.g., 4K) and high-performance images (60 FPS).

Figure 9:
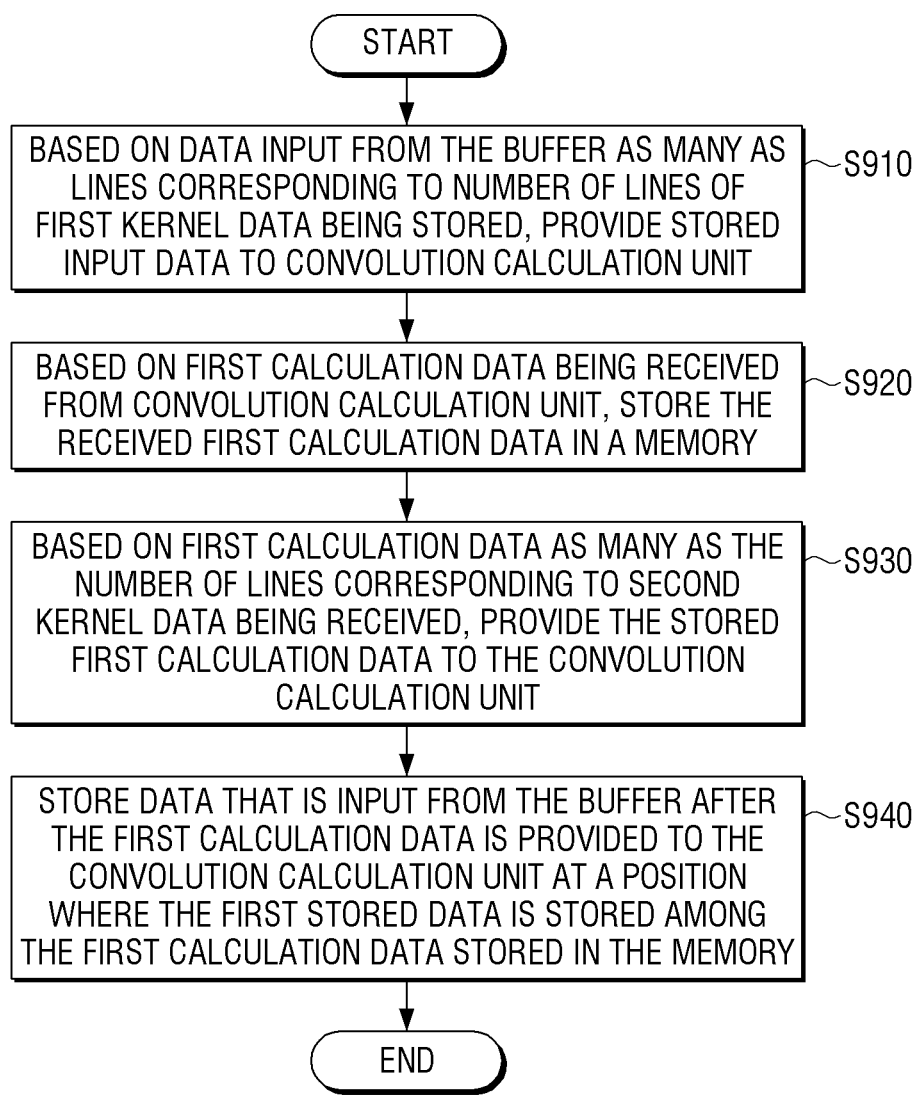
FIG. 9 is a flowchart to describe a control method according to an embodiment.

FIG. 9 is a flowchart to describe a control method according to an embodiment.

According to an embodiment, a control method of a processor including a memory and a convolution calculation unit may, when the data input from the buffer as many as the lines corresponding to the number of the lines of the first kernel data is stored, provide the stored input data to the convolution calculation unit in step S910. Then, when the first calculation data is received from the convolution calculation unit, the received first calculation data may be stored in the memory in step S920. When the first calculation data is stored as many as the number of lines corresponding to the second kernel data is stored, the stored first calculation data may be provided to the convolution calculation unit in step S930.

After the first calculation data is provided to the convolution calculation unit, the data input from the buffer may be stored at a position where the first stored data among the first calculation data stored in the memory is stored in step S940.

The control method according to an embodiment includes the steps of providing the first operation data to the convolution calculation unit, based on the second calculation data being received from the convolution calculation unit, storing the received second calculation data in the memory, based on the second calculation data being stored as many as the number of lines corresponding to the third kernel data, providing the stored second calculation data to the convolution calculation unit, based on the input data input from the buffer being stored in the memory as many as one line, after the first calculation data is provided to the convolution calculation unit, providing the data as many as the number of lines corresponding to the first kernel data including the line to the convolution calculation unit, and based on the first calculation data being received, storing the received first calculation data at a position where the first stored data among the second calculation data is stored.

Here, the memory may store as many as the lines corresponding to the number of lines of the first kernel data to the M$^{th}$ kernel data, at the minimum.

Here, the control method according to an embodiment may include the steps of providing the M-1$^{th}$ calculation data to the convolution calculation unit, based on the M-2$^{th}$ calculation data being received on the basis of the data input from the buffer after the first calculation data is provided to the convolution calculation unit, storing the received M-2$^{th}$ calculation data at a position where the first stored data is stored among the M-1$^{th}$ calculation data, and after the M-2$^{th}$ calculation data as many as the lines corresponding to the number of lines of the M-1$^{th}$ kernel data including the M-2$^{th}$ calculation data is provided, when the M-1$^{th}$ calculation data is received, storing the received M-1$^{th}$ calculation data at a position where the first stored data is stored among the input data.

In addition, the control method according to an embodiment may include, based on the M-1$^{th}$ calculation data as many as the lines corresponding to the number of lines of the M$^{th}$ kernel data being stored, providing the M-1$^{th}$ calculation data to the convolution calculation unit and outputting the M$^{th}$ calculation data received from the convolution calculation unit to the output buffer.

In addition, while the M-3$^{th}$ calculation data as many as the lines corresponding to the number of lines of the M-2$^{th}$ kernel data is stored, the steps of storing the M-2$^{th}$ calculation data received from the convolution calculation unit at a position of the first stored data among the M-1$^{th}$ calculation data stored in the memory, while the M-2$^{th}$ calculation data as many as the lines corresponding to the number of lines of M-1$^{th}$ kernel data is stored, storing the M-1$^{th}$ calculation data received from the convolution calculation data at a position where the first stored data is stored among the input data stored in the memory.

According to an embodiment, the memory may be the circular memory.

In addition, in the control method according to an embodiment, the data input from the buffer may include a logical address, and the step of S910 of providing the input data to the convolution calculation unit may include storing the input data in a memory based on the logical address.

Meanwhile, the various embodiments described above may be implemented in a recording medium that may be read by a computer or a similar device using software, hardware, or a combination thereof. In some cases, the embodiments described herein may be implemented by the processor itself. According to a software implementation, embodiments such as the procedures and functions described herein may be implemented with separate software modules. Each of the software modules may perform one or more of the functions and operations described herein.

Meanwhile, computer instructions for performing the processing operations according to various embodiments described above may be stored in a non-transitory computer-readable medium. Computer instructions stored in such non-transitory computer-readable medium may cause a particular device to perform processing operations according to various embodiments described above when executed by a processor.

The non-transitory computer readable medium refers to a medium that stores data semi-permanently rather than storing data for a very short time, such as a register, a cache, a memory or etc., and is readable by an apparatus. In detail, the specific examples of the non-transitory computer readable medium are a compact disc (CD), a digital versatile disc (DVD), a hard disc, a Blu-ray disc, a universal serial bus (USB), a memory card, a read only memory (ROM), and the like.

While the disclosure has been particularly shown and described with reference to the embodiments thereof, it is to be understood that the disclosure is not limited to the disclosed embodiments, but, it should be understood that various modifications may be made by those skilled in the art without departing from the spirit and scope of the disclosure.

What is claimed is:

1. A processor comprising:
    a memory;
    a convolution calculation unit; and
    a controller configured to:
    store image data input from a buffer in the memory,
    based on the image data being stored as many as lines corresponding to a number of lines of first kernel data, provide the image data stored in the memory to the convolution calculation unit,
    based on first calculation data being output by the convolution calculation unit, store the first calculation data in the memory, and
    based on the first calculation data being stored as many as a number of lines corresponding to second kernel data, provide the first calculation data to the convolution calculation unit,
    wherein the convolution calculation unit is configured to:
    obtain the first calculation data by performing a convolution calculation based on the image data stored in the memory and the first kernel data, and
    obtain second calculation data by performing a convolution calculation based on the first calculation data and the second kernel data, and
    wherein the controller is further configured to:
    based on new image data being input from the buffer after the first calculation data is provided to the convolution calculation unit, store the new image data at a position of first-stored data among the first calculation data stored in the memory.

2. The processor of claim 1, wherein the controller is further configured to:
    provide the first calculation data to the convolution calculation unit,
    based on the second calculation data being received from the convolution calculation unit, store the second calculation data in the memory,
    based on the second calculation data being stored as many as a number of lines corresponding to third kernel data, provide the second calculation data stored in the memory to the convolution calculation unit,
    based on the new image data input from the buffer as many as one line being stored in the memory after the first calculation data is provided to the convolution calculation unit, provide image data as many as a number of lines corresponding to the first kernel data to the convolution calculation unit, the provided image data including a line corresponding to the new image data, and
    based on the first calculation data being received from the convolution calculation unit, store the first calculation data at a position of first-stored data among the second calculation data stored in the memory.

3. The processor of claim 2, wherein the memory is configured to store data as many as lines corresponding to the number of lines of the first kernel data to $M^{th}$ kernel data, at a minimum.

4. The processor of claim 3, wherein the controller is further configured to:
    provide $M$-$1^{th}$ calculation data to the convolution calculation unit,
    based on $M$-$2^{th}$ calculation data that is based on the provided image data, store the $M$-$2^{th}$ calculation data at a position of first-stored data among the $M$-$1^{th}$ calculation data in the memory, wherein the provided image data includes a line corresponding to the new image data input from the buffer being received after the first calculation data is provided to the convolution calculation unit, and
    based on the $M$-$1^{th}$ calculation data being received after the $M$-$2^{th}$ calculation data as many as lines corresponding to a number of lines of $M$-$1^{th}$ kernel data is provided to the convolution calculation unit, store the $M$-$1^{th}$ calculation data at a position of first-stored data among data corresponding to the number of lines of the first kernel data to the $M^{th}$ kernel data in the memory.

5. The processor of claim 4, wherein the controller is further configured to:
    based on the $M$-$1^{th}$ calculation data being stored as many as lines corresponding to a number of lines of the $M^{th}$ kernel data, provide the $M$-$1^{th}$ calculation data to the convolution calculation unit, and output $M^{th}$ calculation data received from the convolution calculation unit.

6. The processor of claim 3, wherein the controller is further configured to:
    while $M$-$3^{th}$ calculation data is stored as many as lines corresponding to a number of lines of $M$-$2^{th}$ kernel data, store $M$-$1^{th}$ calculation data received from the convolution calculation unit at a position of first-stored data among $M$-$1^{th}$ calculation data stored in the memory, and
    while the $M$-$2^{th}$ calculation data as many as lines corresponding to a number of lines of $M$-$1^{th}$ kernel data is stored, store the $M$-$1^{th}$ calculation data received from the convolution calculation unit at a position of first-stored data among the image data corresponding to the number of lines of the first kernel data to the $M^{th}$ kernel data stored in the memory.

7. The processor of claim 6, wherein the memory is a circular memory.

8. The processor of claim 1, wherein the buffer provides data and a logical address associated with the data to the controller, and wherein the controller stores the data in the memory based on the logical address.

9. An electronic apparatus comprising:
a buffer configured to group input data in a unit of a line and allocate a logical address; and
a processor including a memory and a convolution calculation unit, wherein the processor is configured to:
store image data that is input from the buffer based on the logical address in the memory,
based on the image data being stored as many as lines corresponding to a first number of lines of first kernel data, provide the image data corresponding to the first number of lines of first kernel data to the convolution calculation unit,
based on first calculation data being output by the convolution calculation unit, store the first calculation data in the memory,
based on the first calculation data as many as lines corresponding to a second number of lines of second kernel data being stored in the memory, provide the first calculation data corresponding to the second number of lines of second kernel data to the convolution calculation unit, and
after the first calculation data corresponding to the second number of lines of second kernel data is provided to the convolution calculation unit, store new image data input from the buffer at a position of first-stored data among the first calculation data stored in the memory.

10. The electronic apparatus of claim 9, wherein the convolution calculation unit is configured to:
obtain the first calculation data by performing a convolution calculation based on the image data and the first kernel data, and
obtain second calculation data by performing a convolution calculation based on the first calculation data and the second kernel data.

11. A method of controlling a processor including a memory and a convolution calculation unit, the method comprising:
storing image data input from a buffer in the memory;
based on the image data being stored as many as lines corresponding to a number of lines of first kernel data being stored in the memory, providing the image data stored in the memory to the convolution calculation unit;
obtaining first calculation data by performing a convolution calculation based on the image data stored in the memory and the first kernel data;
based on the first calculation data being output by the convolution calculation unit, storing the first calculation data in the memory;
based on the first calculation data being stored as many as a number of lines corresponding to second kernel data, providing the first calculation data to the convolution calculation unit;
obtaining second calculation data by performing a convolution calculation based on the first calculation data and the second kernel data; and based on new image data being input from the buffer after the first calculation data is provided to the convolution calculation unit, storing the new image data at a position of first-stored data among the first calculation data stored in the memory.

12. The method of claim 11, further comprising:
providing the first calculation data to the convolution calculation unit and, based on the second calculation data being received from the convolution calculation unit, storing the second calculation data in the memory;
based on the second calculation data being stored as many as a number of lines corresponding to third kernel data, providing the second calculation data to the convolution calculation unit;
based on the new image data input from the buffer as many as one line being stored in the memory after the first calculation data is provided to the convolution calculation unit, providing image data as many as a number of lines corresponding to the first kernel data to the convolution calculation unit, the provided image data including a line corresponding to the new image data; and
based on the first calculation data being received from the convolution calculation unit, storing the first calculation data at a position of first-stored data among the second calculation data stored in the memory.

13. The method of claim 12, wherein the memory is configured to store data as many as lines corresponding to the number of lines of the first kernel data to $M^{th}$ kernel data, at a minimum.

14. The method of claim 13, further comprising:
providing M-$1^{th}$ calculation data to the convolution calculation unit;
based on M-$2^{th}$ calculation data that is based on the provided image data, storing the M-$2^{th}$ calculation data at a position of first-stored data among the M-$1^{th}$ calculation data in the memory, wherein the provided image data includes a line corresponding to the new image data input from the buffer being received after the first calculation data is provided to the convolution calculation unit; and
based on the M-$1^{th}$ calculation data being received after the M-$2^{th}$ calculation data as many as lines corresponding to a number of lines of M-$1^{th}$ kernel data is provided to the convolution calculation unit, storing the M-$1^{th}$ calculation data at a position of first-stored data among data corresponding to the number of lines of the first kernel data to the $M^{th}$ kernel data in the memory.

15. The method of claim 14, further comprising:
based on the M-$1^{th}$ calculation data being stored as many as lines corresponding to a number of lines of the $M^{th}$ kernel data, providing the M-$1^{th}$ calculation data to the convolution calculation unit, and outputting $M^{th}$ calculation data received from the convolution calculation unit.

16. The method of claim 13, further comprising:
while M-$3^{th}$ calculation data is stored as many as lines corresponding to a number of lines of M-$2^{th}$ kernel data is stored, storing M-$2^{th}$ calculation data received from the convolution calculation unit at a position of first-stored data among M-$1^{th}$ calculation data stored in the memory; and
while the M-$2^{th}$ calculation data as many as lines corresponding to a number of lines of M-$1^{th}$ kernel data is stored, storing the M-$1^{th}$ calculation data received from the convolution calculation unit at a position of first-stored data among the image data corresponding to the number of lines of the first kernel data to $M^{th}$ kernel data stored in the memory.

17. The method of claim 11, wherein the memory is a circular memory.

18. The method of claim 11, wherein the buffer provides a logical address associated with the image data to the processor, and
   wherein the providing the image data to the convolution calculation unit comprises storing the image data in the memory based on the logical address.

* * * * *